(12) United States Patent
Masterson et al.

(10) Patent No.: US 9,852,407 B2
(45) Date of Patent: Dec. 26, 2017

(54) SYSTEMS AND METHODS FOR ROUTING DEBIT TRANSACTIONS

(75) Inventors: Bradley T. Masterson, Elkhorn, NE (US); George F. Gogol, North Olmsted, OH (US); Donna Collela, Pompton Lakes, NJ (US); David M. Hulbert, Lake Worth, FL (US); Thomas Howe, Phoenix, MD (US); Robert J. Cole, Maysville, GA (US)

(73) Assignee: First Data Corporation, Greenwood Village, CO (US)

( * ) Notice: Subject to any disclaimer, the term of this patent is extended or adjusted under 35 U.S.C. 154(b) by 176 days.

(21) Appl. No.: 13/601,451

(22) Filed: Aug. 31, 2012

(65) Prior Publication Data
US 2013/0282563 A1    Oct. 24, 2013

Related U.S. Application Data

(60) Provisional application No. 61/529,535, filed on Aug. 31, 2011.

(51) Int. Cl.
| | |
|---|---|
| *G06Q 40/00* | (2012.01) |
| *G06Q 20/10* | (2012.01) |
| *G06Q 20/08* | (2012.01) |
| *G06Q 20/26* | (2012.01) |

(52) U.S. Cl.
CPC ............. *G06Q 20/10* (2013.01); *G06Q 20/08* (2013.01); *G06Q 20/26* (2013.01)

(58) Field of Classification Search
USPC ...... 705/35, 40, 45, 39, 37, 44, 17; 370/230, 370/252, 310, 447, 352, 351, 362; 235/380; 709/238; 507/40
See application file for complete search history.

(56) References Cited

U.S. PATENT DOCUMENTS

| | | | | |
|---|---|---|---|---|
| 6,847,947 | B1 * | 1/2005 | Kambour et al. | 705/39 |
| 7,359,880 | B2 * | 4/2008 | Abel | G06Q 20/02 235/379 |
| 8,886,563 | B2 * | 11/2014 | Sakata | G06Q 30/04 235/380 |
| 9,141,948 | B2 * | 9/2015 | Dickelman | G06Q 20/20 |
| 9,251,510 | B2 * | 2/2016 | Dickelman | G06Q 20/02 |
| 9,367,839 | B2 * | 6/2016 | Dickelman | G06Q 20/10 |

(Continued)

*Primary Examiner* — Tien Nguyen
(74) *Attorney, Agent, or Firm* — Eversheds Sutherland (US) LLP

(57) ABSTRACT

Systems and methods for routing debit transactions. In one embodiment, a method for routing debit transactions can be provided. The method can include obtaining, by a routing determination system comprising one or more computers, information associated with a proposed debit transaction. The method can also include identifying, by the routing determination system based at least in part upon the obtained information, one or more merchant parameters associated with a merchant on whose behalf the proposed debit transaction will be submitted to a transaction processor. Further, the method can include determining, by the routing determination system based at least in part upon the one or more merchant parameters, a debit transaction network for routing the proposed debit transaction to the transaction processor, wherein the debit transaction network is included in a plurality of available debit transaction networks.

28 Claims, 6 Drawing Sheets

(56) References Cited

U.S. PATENT DOCUMENTS

| | | | | |
|---|---|---|---|---|
| 9,424,562 | B2* | 8/2016 | Dickelman | G06Q 20/02 |
| 2003/0061157 | A1* | 3/2003 | Hirka | G06Q 20/04 705/39 |
| 2005/0203809 | A1* | 9/2005 | Stone | G06Q 10/087 705/7.19 |
| 2005/0243857 | A1* | 11/2005 | Hofstaedter | H04L 45/04 370/447 |
| 2006/0282382 | A1* | 12/2006 | Balasubramanian | G06Q 20/02 705/44 |
| 2007/0233597 | A1* | 10/2007 | Petersen | G06Q 20/04 705/39 |
| 2007/0233603 | A1* | 10/2007 | Schmidgall | G06Q 20/02 705/51 |
| 2008/0052150 | A1* | 2/2008 | Grouf | G06Q 30/02 705/14.48 |
| 2008/0137568 | A1* | 6/2008 | Ho | H04L 45/245 370/310 |
| 2009/0070246 | A1* | 3/2009 | Tieken | G06Q 20/04 705/35 |
| 2009/0164330 | A1* | 6/2009 | Bishop | G06Q 20/02 705/19 |
| 2009/0171796 | A1* | 7/2009 | Carroll | G06Q 20/10 705/17 |
| 2009/0177563 | A1* | 7/2009 | Bernstein | G06Q 20/04 705/30 |
| 2010/0204557 | A1* | 8/2010 | Kiaie | A61B 5/14532 600/365 |
| 2010/0228672 | A1* | 9/2010 | Karim | G06Q 20/40 705/44 |
| 2011/0106638 | A1* | 5/2011 | Fernandez | G06Q 20/10 705/17 |
| 2011/0131133 | A1* | 6/2011 | Hirka et al. | 705/39 |
| 2011/0246358 | A1* | 10/2011 | Blackhurst | G06Q 20/10 705/39 |
| 2012/0265680 | A1* | 10/2012 | Lynch et al. | 705/44 |
| 2012/0271765 | A1* | 10/2012 | Cervenka | G06Q 20/32 705/44 |
| 2013/0060688 | A1* | 3/2013 | Hurst | G06Q 40/02 705/41 |
| 2013/0254110 | A1* | 9/2013 | Royyuru | G06Q 20/38 705/44 |
| 2014/0040114 | A1* | 2/2014 | Baumgart | G06Q 20/027 705/39 |

\* cited by examiner

SYSTEMS AND METHODS FOR ROUTING DEBIT TRANSACTIONS

RELATED APPLICATION

This application claims priority to U.S. Ser. No. 61/529,535, titled "Systems and Methods for Routing Debit Transactions," filed Aug. 31, 2011, the contents of which are incorporated herein by reference.

FIELD OF THE DISCLOSURE

Embodiments of the disclosure relate generally to the routing of debit transactions, and more particularly, to the routing of debit transactions based at least in part upon one or more merchant parameters.

BACKGROUND

In a conventional debit transaction with a merchant, a consumer typically swipes his or her card and elects to proceed with a debit transaction. Following the election of a debit transaction, the debit transaction is typically routed to a suitable PIN (personal identification number)-type network based upon preferences of a card issuing entity, such as a financial institution that issued a debit card to the customer.

For example, as shown in FIG. 1, a data flow of a conventional debit transaction 100 can include some or all of the following: (1) At a merchant location, a consumer swipes his or her debit card at a point of sale terminal to pay for a purchase; (2) the terminal will prompt the consumer for a PIN (if the terminal is enabled to accept PIN transactions); (3) the consumer either enters a PIN or elects to transact without a PIN, therefore creating a signature debit transaction; (4) when a PIN is entered, the merchant's processing system interrogates the transaction to determine a method instructed by the issuing bank or financial institution for routing the PIN transaction; and (5) the directions for routing to the enabled PIN network is typically based on an analysis of a BIN table, which is managed and controlled by the issuing bank or financial institution.

There could be opportunities to improve conventional systems and methods for routing debit transactions.

SUMMARY

Some or all of the above needs can be addressed by embodiments of the disclosure. In certain embodiments, systems and methods for routing debit transactions can be provided. In certain other embodiments, systems and methods for routing debit transactions based at least in part upon one or more merchant parameters can be provided.

In one embodiment, a method for routing debit transactions can be provided. The method can include obtaining, by a routing determination system comprising one or more computers, information associated with a proposed debit transaction. The method can also include identifying, by the routing determination system based at least in part upon the obtained information, one or more merchant parameters associated with a merchant on whose behalf the proposed debit transaction will be submitted to a transaction processor. Further, the method can include determining, by the routing determination system based at least in part upon the one or more merchant parameters, a debit transaction network for routing the proposed debit transaction to the transaction processor, wherein the debit transaction network is included in a plurality of available debit transaction networks.

In one embodiment, a system for routing debit transactions can be provided. The system can include at least one memory device configured to store computer-executable instructions. The system can also include at least one processor configured to access the at least one memory device and execute the computer-executable instructions. The computer-executable instructions can be operable to obtain information associated with a proposed debit transaction. The computer-executable instructions can be further operable to identify, based at least in part upon the obtained information, one or more merchant parameters associated with a merchant on whose behalf the proposed debit transaction will be submitted to a transaction processor. Further, the computer-executable instructions can be operable to determine, based at least in part upon the one or more merchant parameters, a debit transaction network for routing the proposed debit transaction to the transaction processor, wherein the debit transaction network is included in a plurality of available debit transaction networks.

Other embodiments and aspects will become apparent from the following description taken in conjunction with the following drawings.

DETAILED DESCRIPTION

Figure 1:
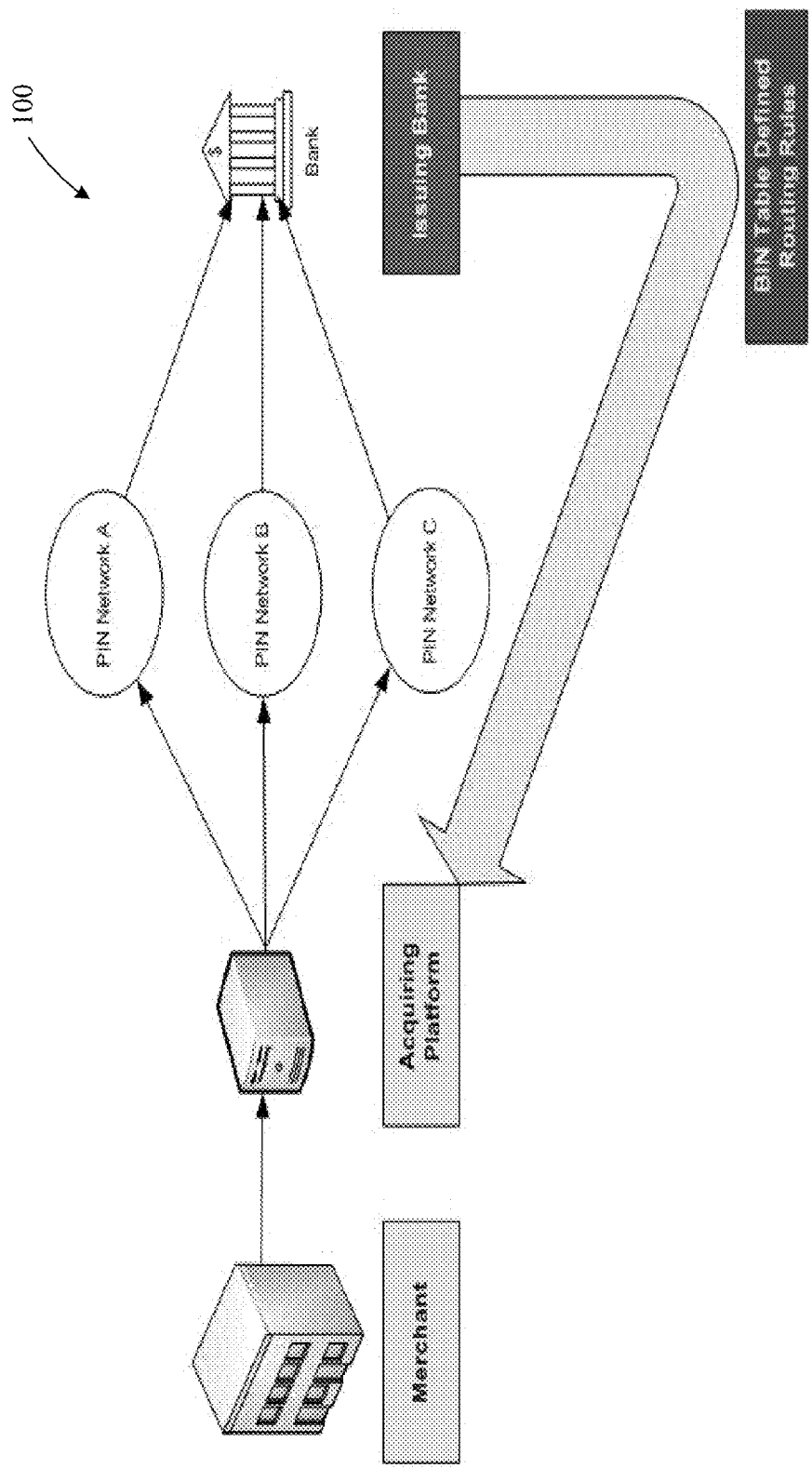
FIG. 1 is a process flow diagram illustrating a conventional routing debit transaction system and method.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for routing debit transactions. According to an aspect of the disclosure, one or more merchant parameters and/or merchant preferences may be taken into consideration during the routing of a debit transaction. For example, one or more merchant parameters may be taken into consideration during the selection of a PIN (personal identification-number) network to facilitate routing of a debit transaction from a merchant location and/or an acquiring platform to a transaction processor, such as an issuing financial institution associated with a debit account (e.g., a debit card account).

In certain embodiments, a merchant device, such as a point of sale terminal, may communicate a routing determination request to a service provider system or to an acquiring platform. The received routing determination request may be processed in order to determine a suitable PIN network for routing a proposed transaction, and a response that includes an indication of the determined PIN network may be returned to the merchant device. In other embodiments, software resident on the merchant device may evaluate a proposed transaction in order to determine a suitable PIN network for routing.

As desired in various embodiments of the disclosure, a wide variety of different merchant parameters may be evaluated during a routing determination. These parameters include, but are not limited to, merchant PIN network preference, parameters associated with established merchant banking relationships, transaction specific routing rules, parameters associated with different outlets or locations for the merchant, priority fee or fee optimization (e.g., least cost) routing parameters, bypass tools routing parameters, channel negotiated routing parameters, merchant negotiated routing parameters, volume based routing parameters, amount based routing parameters, and/or dynamic transaction routing parameters. Additionally, in certain embodiments, merchant parameters may be utilized in combination with other parameters, such as preferences of the issuing financial institution.

In one example embodiment, based upon the receipt of a routing determination request, an issuing financial institution and a merchant may be identified. Respective PIN networks for the issuing financial institution and the merchant may then be determined or identified. For example, one or more tables of supported networks (e.g., banking identification number "BIN" tables, merchant tables, etc.) may be accessed in order to determine supported PIN networks for both the merchant and the issuing financial institution. A set of one or more shared or common supported PIN networks may then be determined by evaluating the networks supported by each entity. Any number of merchant preferences and/or parameters may then be evaluated in order to select a suitable shared PIN network to be utilized in the routing of the debit transaction.

A PIN network may be any suitable network that allows a debit transaction to be routed. Examples of suitable PIN networks include, but are not limited to, the STAR network, the PULSE network, the PLUS network, and/or the Interlink network. In certain embodiments, a PIN network may be an inter-bank network or a network that facilitates communications between financial institutions. Additionally, a PIN network may be different from a signature network (e.g., a VISA network, a MasterCard network, etc.) that facilitates the routing of credit transactions.

Certain embodiments of the disclosure can facilitate debit transaction routing based at least in part upon merchant preferences and/or parameters. Based at least in part upon certain legislation, such as the Durbin Amendment to the Dodd-Frank Wall Street Reform Act, routing preferences of a merchant may be taken into consideration during the selection or determination of a PIN network for routing a debit transaction.

Figure 2:
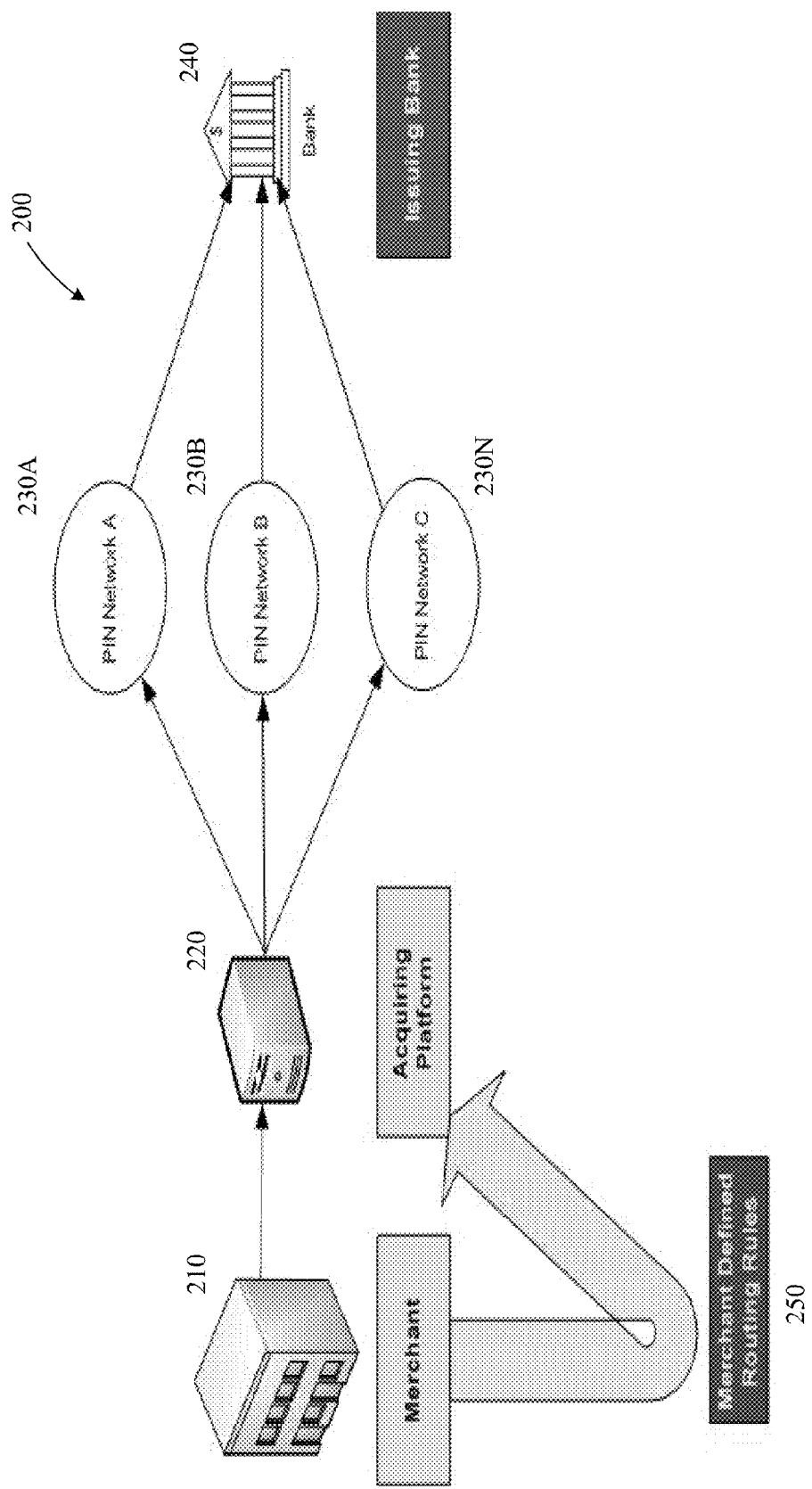
FIG. 2 is a process flow diagram illustrating an example system and method for routing debit transactions in accordance with an embodiment of the disclosure.

In FIG. 2 an example transaction flow for a debit transaction routing 200 in accordance with embodiments of the disclosure is illustrated and briefly described as follows. At a merchant location, such as 210, a consumer can swipe his debit card at a merchant point-of-sale device to pay for a purchase. Alternatively, the consumer can provide a debit card number to a merchant 210, e.g., a Web-based merchant, etc., for entry of the debit card number via a point-of-sale or other transaction-type device. The merchant 210 can prompt the consumer for a PIN associated with the debit card and/or debit card number. For example, if a merchant point-of-sale device is enabled to accept PIN transactions, the consumer may be prompted for a PIN. The consumer can either enter a PIN or elect to transact without a PIN, therefore creating a signature debit transaction. When a PIN is entered, a merchant's processing system 220, e.g., a merchant system, a merchant service provider, an acquiring platform, etc., can interrogate or otherwise process the transaction to determine one or more PIN networks 230A-230N supported by an issuing bank 240 or financial institution issuer and/or preferred by a financial institution network. The merchant's processing system 220 can identify or otherwise determine one or more PIN networks 230A-230N that may be supported by the merchant 210. After one or more common or shared PIN networks, such as 230A-230N, are identified by the merchant's processing system 220, a common or shared PIN network, such as 230A, can be selected based upon preferences and/or parameters associated with the merchant. For example, one or more merchant defined routing rules 250 can be utilized in conjunction with the PIN networks that the issuing bank 240 or financial institution issuer has enabled in order to select a PIN network for routing the debit transaction.

In various embodiments of the disclosure, the routing of a debit transaction may be determined by the merchant and/or based upon merchant preferences. The merchant may be the stakeholder in the transaction chain that has to pay an interchange amount to an issuer for each transaction. Accordingly, the merchant may be allowed to determine how a transaction will be routed and/or which PIN network will be utilized.

Figure 3:
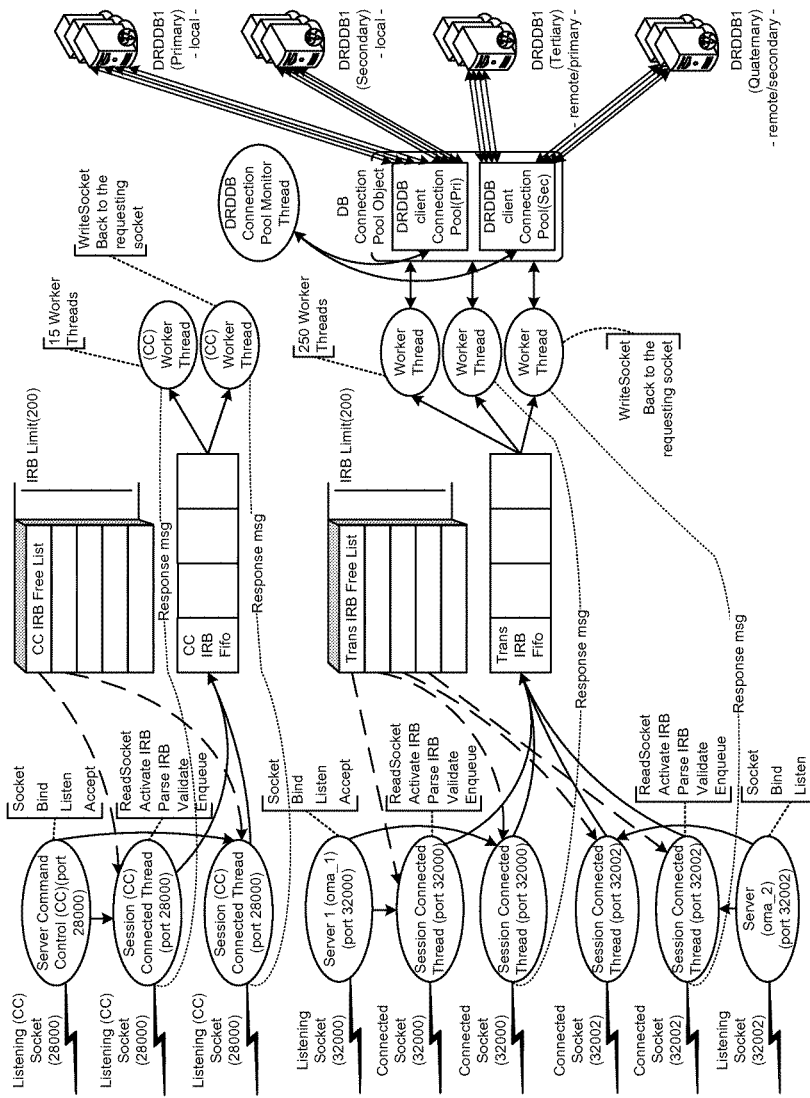
FIG. 3 is a block diagram illustrating an example system and method for routing debit transactions in accordance with an embodiment of the disclosure.

In certain embodiments, a fundamental shift in transaction decision rights can facilitate the development of tools that allow merchants to optimize their debit routing choices. In certain embodiments, a dynamic routing decision system ("DRDSYS") or a smart routing engine or application may be deployed and/or utilized to accomplish routing optimization tasks. An example DRDSYS 300 is illustrated in FIG. 3 in accordance with an embodiment of the disclosure. One will appreciate that other component configurations for a DRDSYS may be utilized as desired in various embodiments of the disclosure. The DRDSYS 300 may be deployed at a wide variety of locations and/or in conjunction with a wide variety of different entities. For example, the DRDSYS 300 may be a service provider that is accessed by one or more merchants (e.g., merchant point of sale terminals, other merchant systems, etc.) in order to evaluate proposed transactions and/or to provide routing determinations. As another example, the DRDSYS 300 may be associated with an acquiring platform that can serve as an interface between a merchant and one or more PIN networks.

In one example embodiment, the DRDSYS 300 may receive a transaction and/or information associated with a transaction, and the DRDSYS 300 may extract a wide variety of different information, such as identification information for a financial institution issuer, identification information for a merchant, a location of the merchant, and/or an amount associated with the transaction. The DRDSYS 300 may then evaluate at least a portion of the extracted information in conjunction with any number of merchant routing preferences (e.g., merchant preferences stored in a relational database associated with the DRDSYS 300, merchant preferences included in or appended to the transaction, etc.) in order to determine a suitable PIN network that the debit transaction will be routed to for processing.

In certain embodiments, the DRDSYS 300 may include one or more suitable processor-driven devices that facilitate the evaluation of a transaction. Examples of suitable processor-driven devices include, but are not limited to, server computers, personal computers, application-specific circuits, minicomputers, and/or other processor-based devices. In addition to one or more processors, the DRDSYS 300 may include any number of memory devices, input/output interfaces, and/or network interfaces. The memory may be configured to store computer-executable instructions and/or various program modules that may be executed by the one or more processors. In doing so, a special purpose computer or particular machine may be formed that facilitates debit routing determinations.

One example of the logic embodied in one or more computer-executable instructions that may be implemented by the DRDSYS 300 can be as follows. Merchant parameters and/or merchant routing logic may be accessed or obtained from one or more databases and/or database servers, such as an SQL database that includes merchant data. In certain embodiments, the database server may also include merchant routing configuration data. Accordingly, an impact on network traffic latency as a result of evaluated merchant parameters may be reduced and/or limited.

A typical routing decision may be initiated with a BIN look-up using a primary account number ("PAN") associated with the transaction, such as a debit account number. The calculation for this lookup may be completed by comparing the existing BINs in the BIN_INFO table to the account number and finding the most significant BIN. An extract of sorts may be performed to identify the PIN networks supported by the financial institution issuer or BIN.

After the above extract, a query may be performed on one or more merchant tables in order to identify supported networks associated with the merchant. The BIN and merchant networks can then be matched to find one or more common networks, and the common networks may optionally be ordered based upon data included in an STD_ORDER table. If the order values of the STD_ORDER table do not cover all networks included in the BIN/merchant network merge, then a secondary order field included in the merchant information may be utilized to complete or "finish off" the ordering/sorting.

One or more merchant parameters and/or preferences may be utilized to order the PIN networks and/or to select a PIN network to be utilized. A few example methods and/or techniques for selecting a merchant network are described in greater detail below.

In certain embodiments, a wide variety of other factors may be taken into consideration, such as state override factors and/or network outage factors. State override factors may allow a state (e.g., a state governmental entity, etc.) to legally establish or set a network precedence between any number of PIN networks. Network outage factors may allow for a network to be placed at the bottom of a route list to be reserved for "special" demand in the event of a network problem. In certain embodiments, these additional factor sorts may take higher priority than merchant parameter sorts. Additionally, a wide variety of priorities may exist between the additional factor sorts. For example, network outage sorting may take precedence over state override sorting.

As desired in various embodiments of the disclosure, a wide variety of different types of merchant parameters and/or preferences may be taken into consideration. In certain embodiments, these preferences and/or parameters may result in a wide variety of different merchant-based routing types. A few example routing types, including merchant-based routing types, are discussed below.

STR—Standard Transaction Routing. In some instances, a system can allow for Standard Transaction Routing preferences to be established at a service provider level, business channel level, merchant level, and/or outlet level. In certain embodiments, the STR preferences may evaluate and/or take into consideration the preferences of a financial institution issuer in order to determine a PIN network to be utilized.

In certain embodiments, the system may determine a separate order preference based on the least cost network for the merchant. In one example embodiment, the system logic may apply a STR routing order based on one or more of the merchant MCC, a determination of whether the transaction is regulated vs. unregulated, and/or based upon a transaction price utilizing a series of any number of price range 'buckets' (e.g., $0.00-$25.00/$25.01-$50.00/$50.01-$100.00/ $100.01-250.00/>$250.00 where the user may adjust the number of buckets and/or dollar value of the 'buckets'). Transactions that are unregulated (not covered by the Durbin amendment) may be routed based upon a calculation using the average ticket amount for specific merchant categories and applying the appropriate network fees.

CDR—Channel Defined Routing. In some instances, CDR may take established banking relationships of the merchant into consideration. For example, if a merchant has an established relationship or routing agreement with a financial institution, then a hierarchy of PIN networks may be determined based at least in part upon the defined relationship or channel.

Channel version of STR. In some instances, the system can allow external clients and/or service provider employees to have the ability to establish and/or revise the routing order preference of PIN debit networks at various levels of the hierarchy (hierarchy could be variable by platform).

Platform level—including those merchants set up with MDR. (This would be used in the event of severe processing degradation with a PIN debit network.)

Business Owner level—excluding those merchants with MDR.

In one example embodiment, the system logic can apply CDR routing order based on one or more of the merchant MCC, a determination of whether the transaction is regulated vs. unregulated, and finally on transaction price utilizing a series of any number of price range "buckets" (e.g., $0.00-$25.00/$25.01-$50.00/$50.01-$100.00/$100.01- 250.00/>$250.00 where the user may adjust the dollar value of the "buckets").

The system can allow support for the ability to define additional CDR routing order preferences based on the available combinations of an MCC, regulated vs. unregulated transactions, and/or transaction price ranges.

MDR—Merchant Defined Routing. Merchant version of STR—a merchant may define one or more routing rules for routing different types of transactions. The system allows merchants to have the ability to establish and revise the routing order preference of PIN debit networks at various levels of the hierarchy based on where the merchant resides in the current hierarchy structure, such as a Merchant Chain level, or an Outlet level or store level.

The system can allow merchants to have the ability to establish and revise the MDR routing order preference of PIN debit networks at the merchant and outlet hierarchy level based on at least one of the merchant MCC, a determination of whether the transaction is regulated vs. unregulated, and/or a transaction price utilizing a series of any number of price range "buckets" (e.g., $0.00-$25.00/$25.01-$50.00/$50.01-$100.00/$100.01-250.00/>$250.00 where the user may adjust the dollar value of the "buckets") at the merchant and outlet hierarchy level.

Additionally, in certain embodiments, product types and/or point of sale terminal identification may be taken into consideration when choosing a PIN network. For example: a Supermarket merchant may have priority routing preferences for the supermarket transaction activity, but a different routing preferences for pharmacy transactions.

ODR—Outlet Defined Routing. The system can allow merchants to have the ability to establish and revise the ODR routing order preference of PIN debit networks at the outlet level (e.g., the individual store level, etc.) based on one or more of the merchant MCC, a determination of whether the transaction is regulated vs. unregulated, and/or a transaction price utilizing a series of any number of price range "buckets" (e.g., $0.00-$25.00/$25.01-$50.00/$50.01-$100.00/$100.01-250.00/>$250.00 where the user may adjust the dollar value of the "buckets").

The system can allow support for the ability to define additional ODR routing order preferences based on available combinations of MCC, regulated vs. unregulated transactions and any number of transaction price ranges.

PFR—Priority Fee Routing. In addition to each of the levels described above, the system can also support a separate set of routing priority preferences for Priority Fee Routing ("PFR"). Under Priority Fee Routing, merchants may have the ability to set separate routing priority preferences and/or to select how PIN debit network pass-through fees will be billed. In certain embodiments, a PIN network may be selected based upon a least routing cost determination for the merchant.

The system may present two choices under the PFR: (1) bill the rate of the network where the transaction was routed to, (2) or bill the least cost rate of available networks.

In one example embodiment, the system logic can apply a PFR routing order based on one or more of the merchant MCC, a determination of whether the transaction is regulated vs. unregulated, and finally on a transaction price utilizing a series of any number of price range "buckets" (e.g., $0.00-$25.00/$25.01-$50.00/$50.01-$100.00/$100.01-250.00/>$250.00 where the user may adjust the dollar value of the "buckets").

The system can allow support for PFR preferences on any number of Merchant Categories ("MCCs"), for example: Supermarket, Petroleum, QSR, etc. The system can allow support for the ability to define additional PFR routing order preferences based on the available combinations of 10 MCCs, regulated vs. unregulated transactions and any number of transaction price ranges.

Channel Negotiated Routing ("CNR")—(channel version of DTR). The business channels will obtain bids from the networks, and enter rates and network routing orders via a suitable interface, such as a Smart Routing Client Web Site. The system utilizes the bids and/or rates to perform the CNR calculation and routing decision for transactions within the business channel portfolio. The system can allow support for the ability to define additional CNR routing order preferences by MCC based on a breakout by regulated vs. unregulated transactions, and can establish the ability to define routing order preferences for any number of additional MCCs where the transaction is regulated or unregulated.

DTR—Dynamic Transaction Routing. The system allows support for the ability to define additional DTR routing order preferences by MCC and/or a determination of whether the transaction is regulated or unregulated. Additionally, in certain embodiments, the ability may be established to define routing order preferences for any number of additional MCCs where the transaction is a regulated asset class of the issuing bank, and any number of additional MCCs where the transaction is unregulated.

Rates used to determine routing include all pass through rates including interchange, switch fees, administration fees, security fees, cross border fees and any other fees the networks might introduce that factor into the cost of the transactions. In certain embodiments, channel markup fees are not considered in the least cost routing calculation for DTR. Petroleum merchants are excluded from DTR because the final dollar amount of the transaction is not known at the time of authorization. In the event that the DRDOLTP returns a tie among least cost networks, the routing engine maintains default network routing order rankings based on service provider, business channel, merchant, and/or outlet preferences. The system allows support for the ability to define additional DTR routing order preferences by MCC and a further breakout by regulated vs. unregulated transactions, and can establish the ability to define routing order preferences for any number of additional MCCs where the transaction is regulated or unregulated.

MNR—Merchant Negotiated Routing. The merchant will obtain bids from the networks, enter rates and network routing orders via a suitable interface, such as a Smart Routing Client Web Site. The system utilizes the bids and rates to perform an MNR calculation and routing decision for transactions within the merchant hierarchy. These rates and bids are typically not used for actual merchant billing purposes. The system allows support for the ability to define additional MNR routing order preferences by MCC and a further breakout by regulated vs. unregulated transactions, and can establish the ability to define routing order preferences for any number of additional MCCs where the transaction is regulated or unregulated.

VTR—Volume Transaction Routing. The system allows the service provider, a business channel or merchant to establish priority routing based on a volume threshold for a particular network. Once the network threshold is reached, the VTR priority network may retain its original position in the routing order and additional transactions may be routed via the original routing order preferences. The system has the flexibility to offer VTR as a subset of other PIN debit transaction routing methodologies.

Figure 4:
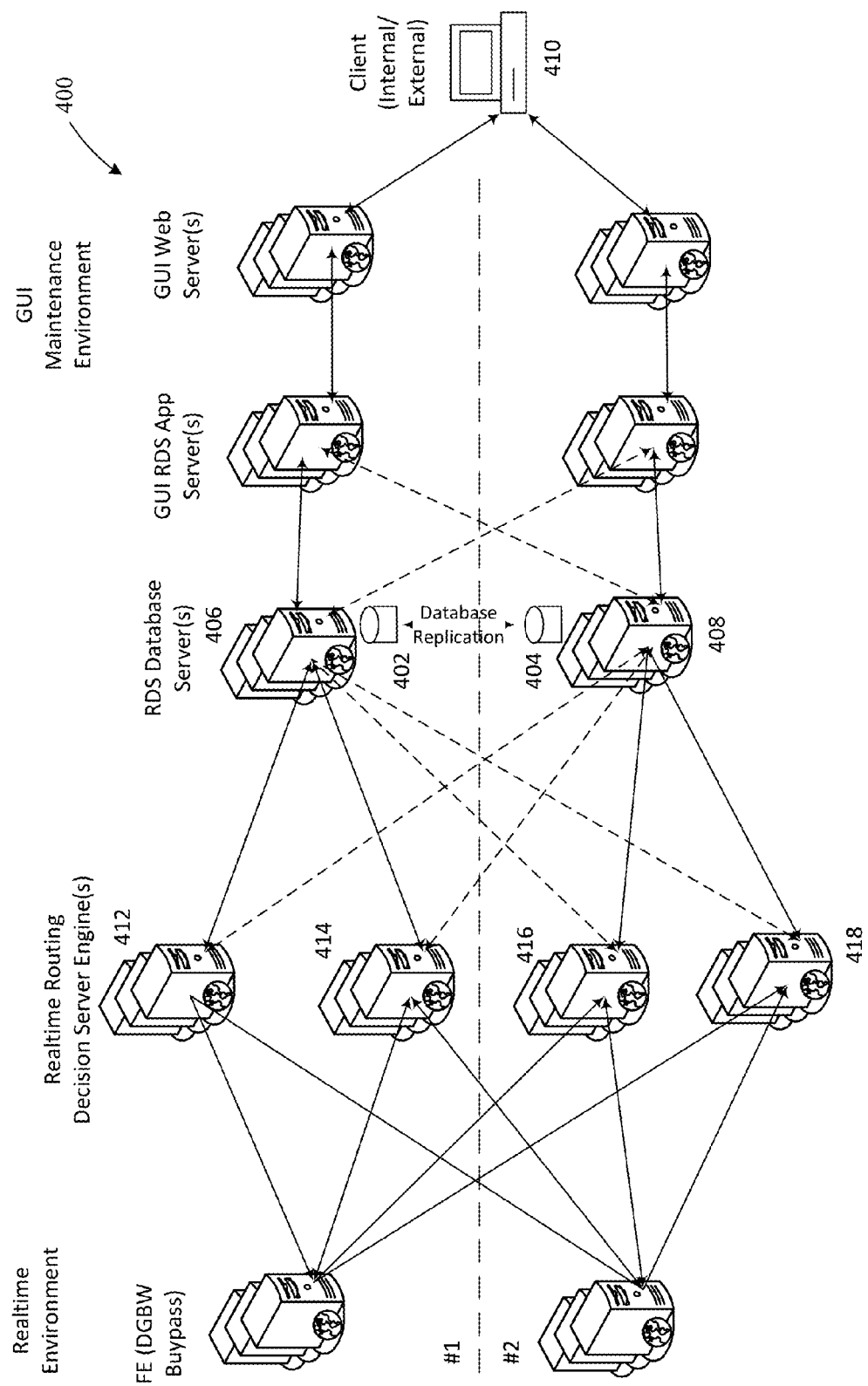
FIG. 4 is a block diagram illustrating an example system and method for routing debit transactions in accordance with an embodiment of the disclosure.

FIG. 4 illustrates an example system and method in accordance with embodiments of the disclosure. In certain embodiments, to achieve availability, a database configuration 400 as shown in FIG. 4 may be employed with a replication scheme. In this regard, attempts may be made to ensure that databases, such as 402 and 404, for various routing engine instances, such as 406 and 408, have been developed. Additionally, the replication may enable a single portal, such as client 410, to be used to update the database, such as 402, and propagate those instructions to any number of server engines, such as 412-418, simultaneously or near simultaneously.

Figure 5:
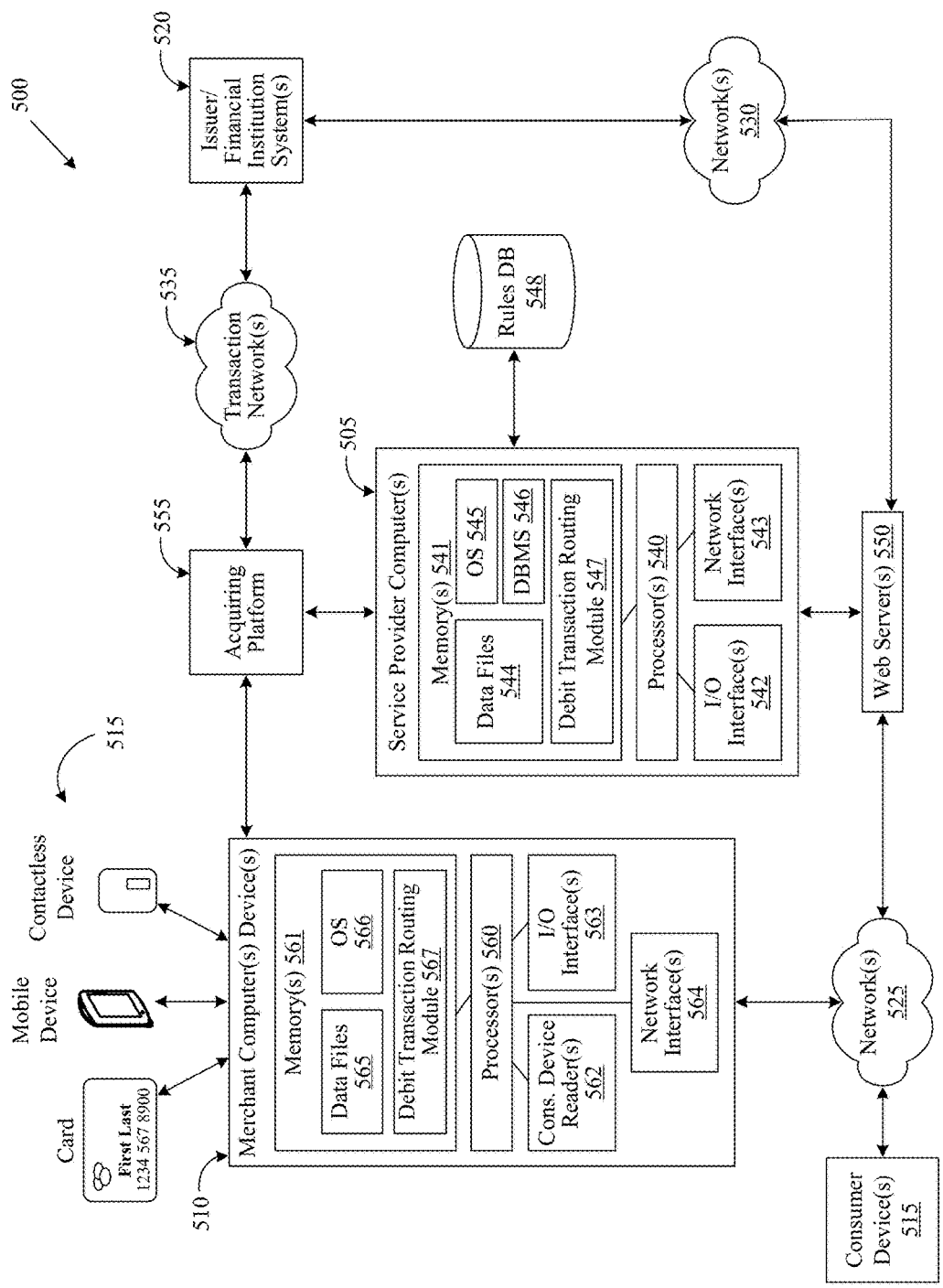
FIG. 5 is a process flow diagram illustrating an example system and method for routing debit transactions in accordance with an embodiment of the disclosure.

FIG. 5 represents a block diagram of an example system 500 for routing debit transactions according to one embodiment of the disclosure. The system 500 may facilitate identifying one or more merchant parameters and determining a debit transaction network for routing a proposed debit transaction to a transaction processor. As shown in FIG. 5, the system 500 may include one or more service provider computers 505 associated with a transaction processing service provider, one or more merchant computers and/or merchant devices (collectively referred to as merchant computers 510), one or more consumer devices 515, and/or one or more issuer and/or financial institution system(s) 520. Any number of suitable networks, such as the illustrated networks 525, 530 and transaction networks 535, may facilitate communication between various components of the systems. Each of these components will now be discussed in further detail.

First, each service provider computer 505 may include any number of processor-driven devices, including but not limited to, a server computer, a mainframe computer, one or more networked computers, a desktop computer, a personal computer, a laptop computer, a mobile computer, or any other processor-based device. A service provider computer 505 may utilize one or more processors 540 to execute computer-readable instructions that facilitate the storage and/or management of various rules, preferences, and/or parameters associated with evaluating proposed debit transactions. Further, the service provider computer 505 may utilize the one or more processors 540 to execute computer-readable instructions that facilitate identifying one or more merchant parameters, determining one or more networks to process the proposed debit transactions, and processing of a proposed debit transaction. In certain embodiments, the service provider computer 505 may utilize the one or more processors 540 to execute computer-readable instructions that facilitate implementation of rules and/or functionality described with respect to the DRDSYS 300 shown and described with respect to FIG. 3. As a result of executing these computer-readable instructions, a special purpose computer or particular machine may be formed that facilitates identifying one or more merchant parameters and determining a debit transaction network for routing a proposed debit transaction to a transaction processor.

In addition to having one or more processors 540, the service provider computer 505 may further include one or more memory devices 541, input/output ("I/O") interface(s) 542, and/or network interface(s) 543. The memory 541 may be any computer-readable medium, coupled to the processor(s) 540, such as random access memory ("RAM"), read-only memory ("ROM"), and/or removable storage devices. The memory 541 may store a wide variety of data files 544 and/or various program modules, such as an operating system ("OS") 545, a database management system ("DBMS") 546, and/or a debit transaction routing module 547. The data files 544 may include any suitable data that facilitates the operation of the service provider computer 505 and/or interaction of the service provider computer 505 with one or more other components of the system 500. For example, the data files 544 may include card issuer identification information, merchant identification information, consumer identification information, data utilized to communicate with the card issuers, merchants, and/or consumers, data that facilitates the storage of transaction processing rules, and/or data that facilitates the processing of a proposed debit transaction, such as determining based at least in part on one or more merchant parameters, a debit transaction network for routing a proposed debit transaction to the transaction processor. The OS 545 may be a suitable module that facilitates the general operation of the service provider computer 505, as well as the execution of other program modules. For example, the OS may be, but is not limited to, Microsoft Windows®, Apple OSX™, Unix, a mainframe computer operating system (e.g., IBM z/OS, MVS, OS/390, etc.), or a specially designed operating system. The DBMS 546 may be a suitable program module that facilitates management of the data files 544, data stored in the memory 541, and/or data stored in one or more separate databases, such as one or more transaction processing rules databases 548.

The one or more rules databases 548 may be configured to store a wide variety of rules that may be utilized to evaluate proposed debit transactions, including but not limited to, payment account issuer rules and/or preferences, merchant rules and/or preferences, and/or consumer rules and/or preferences. In certain embodiments, one or more host modules may be associated with the service provider computer 505, and the host modules may facilitate interaction with other components of the system 500. For example, one or more Web servers 550 may be provided, and the Web servers 550 may facilitate the presentation of any number of suitable graphical user interfaces to collect rules from issuer/financial institution systems 520, merchant computers 510, and/or consumer devices 515. Other example host modules may facilitate inter-process communications and/or other types of communications in order to facilitate the receipt of processing rules and/or preferences. Yet other example host modules may facilitate the receipt of proposed debit transactions to be processed.

A wide variety of suitable processing rules may be utilized as desired in various embodiments of the disclosure. In certain embodiments, merchant defined routing rules may be utilized in conjunction with one or more debit transaction networks that a particular issuer or financial institution has enabled. Examples of suitable rules include, but are not limited to, merchant routing configuration data, merchant preferences, correlations between account numbers and transaction networks supported by an issuer or financial institution, state override factors, network outage factors, prioritization data, merchant-based routing types, and other similar rules. Indeed, a wide variety of different types of rules may be utilized as desired in various embodiments of the disclosure. Additionally, a wide variety of rule combinations may be applicable to various proposed debit transactions.

The debit transaction routing module 547 may include any number of suitable software modules and/or applications that facilitate the storage of debit transaction processing rules and/or parameters, as well as the evaluation of proposed debit transactions. In certain embodiments, the debit transaction routing module 547 can facilitate implementation of rules and/or functionality described with respect to the DRDSYS 300 shown and described with respect to FIG. 3. In operation, the debit transaction routing module 547 may direct the operations of a host module (e.g., the Web server) to facilitate the receipt of a wide variety of different transaction processing rules from issuers, merchants, and/or consumers. The debit transaction routing module 547 may evaluate received rules, resolve conflicts between the rules, and/or establish a hierarchy or prioritization for applying the rules to a proposed debit transaction. The debit transaction routing module 547 may then direct storage of the rules in one or more suitable rules databases 548.

The debit transaction routing module 547 may also be configured to receive information associated with a proposed debit transaction. For example, proposed debit transaction information may be received from a merchant computer or device 510 (e.g., a merchant point of sale device, etc.). As another example, proposed debit transaction information may be received from a merchant acquiring platform 555 or merchant gateway associated with a merchant computer 510. Following receipt of a proposed debit transaction, the debit transaction routing module 547 may identify one or more applicable rules, and the debit transaction routing module 547 may evaluate the proposed debit transaction utilizing the applicable rules. In this regard, the debit transaction routing module 547 may determine whether the proposed transaction may be routed to a particular network and/or issuer for approval and/or settlement processing. Alternatively, the debit transaction routing module 547 may determine a payment account to utilize in association with the proposed debit transaction.

A few examples of the operations that may be performed by the transaction processing module are described in greater detail above with reference to FIGS. 2-4, and below with reference to FIG. 6.

With continued reference to the service provider computer 505, the one or more I/O interfaces 542 may facilitate communication between the service provider computer 505 and one or more input/output devices; for example, one or more user interface devices, such as a display, a keypad, a mouse, a pointing device, a control panel, a touch screen display, a remote control, a microphone, a speaker, etc., that facilitate user interaction with the service provider computer 505. The one or more network interfaces 543 may facilitate connection of the service provider computer 505 to one or more suitable networks, for example, the network(s) 525, 530, 535 illustrated in FIG. 5. In this regard, the service provider computer 505 may receive and/or communicate information to other components of the system 500.

With continued reference to FIG. 5, any number of merchant computers 510 may be provided. In certain embodiments, a merchant computer 510 may be a suitable point-of-sale ("POS") device (e.g., a POS terminal) located at a physical merchant location. In other embodiments, a merchant computer 510 may be a suitable server that facilitates the processing and routing of online debit purchase transactions. As desired, each merchant computer 510 may include any number of processor-driven devices, including but not limited to, a server computer, a mainframe computer, one or more networked computers, a desktop computer, a personal computer, a laptop computer, a mobile computer, or any other processor-based device. A merchant computer 510 may utilize one or more processors 560 to execute computer-readable instructions that facilitate the processing and routing of debit transaction requests, the generation of proposed debit transactions, and/or the communication of proposed debit transactions to a processing network and/or entity (e.g., an acquiring platform, a service provider computer 505, etc.). In certain embodiments, the merchant computer 510 may utilize one or more processors 560 to execute computer-readable instructions that can facilitate implementation of rules and/or functionality described with respect to the DRDSYS 300 shown and described with respect to FIG. 3. As a result of executing these computer-readable instructions, a special purpose computer or particular machine may be formed that facilitates the generation, routing, and/or output of proposed debit transactions. Additionally, in certain embodiments, a merchant computer 510 (which may or may not be located at a POS) may utilize the one or more processors 560 to execute computer-readable instructions that facilitate the provision of issuer and/or merchant rules to the service provider computer 505.

In addition to having one or more processors 560, the merchant computer 510 may further include and/or be associated with one or more memory devices 561, consumer device readers 562, input/output ("I/O") interface(s) 563, and/or network interface(s) 564. The memory 561 may be any computer-readable medium, coupled to the processor(s) 560, such as random access memory ("RAM"), read-only memory ("ROM"), and/or removable storage devices. The memory 561 may store a wide variety of data files 565 and/or various program modules, such as an operating system ("OS") 566, and/or a debit transaction routing module 567. The data files 565 may include any suitable data that facilitates the operation of the merchant computer 510 and/or interaction of the merchant computer 510 with one or more other components of the system 500. For example, the data files 565 may include acquiring platform information, service provider information, and/or routing information for proposed debit transactions. The OS 566 may be a suitable module that facilitates the general operation of the merchant computer 510, as well as the execution of other program modules. For example, the OS 566 may be, but is not limited to, Microsoft Windows®, Apple OSX™, Unix, a mainframe computer operating system (e.g., IBM z/OS, MVS, OS/390, etc.), or a specially designed operating system. As desired, the merchant computer 510 may additionally include one or more host modules that facilitate interaction with remote consumer devices 515. For example, a suitable Web server and/or Web server module may facilitate online shopping by consumers and/or the receipt of debit transaction requests.

The debit transaction routing module 567 may include any number of suitable software modules and/or applications that facilitate the receipt of transaction information, the receipt of payment account information from a consumer device, the generation and routing of a proposed debit transaction, and/or the output of the proposed debit transaction. In one example embodiment, the debit transaction routing module 567 may identify a wide variety of debit transaction information, such as identifiers of products to be purchased (e.g., UPC identifiers, etc.), amounts associated with the products, and/or a total transaction amount. Additionally, the debit transaction routing module 567 may receive payment account information collected from a consumer device. For example, the debit transaction routing module 567 may interact with a consumer device reader 562 to receive payment account information at a point of sale. As another example, the debit transaction routing module 567 may receive payment account information via one or more suitable networks 525, such as the Internet. Following the identification of transaction information and payment account information, the debit transaction routing module 567 may generate a proposed debit transaction or proposed debit transaction request, and the debit transaction routing module 567 may direct communication of the proposed debit transaction to a suitable network and/or entity for processing. For example, the proposed debit transaction may be output for communication to a particular acquiring platform 555, and the acquiring platform 555 may forward the proposed transaction to the transaction network 535 for processing by a particular issuer or financial institution system 520. In certain embodiments, the service provider computer 505 may be associated with a particular acquiring platform 555 and/or transaction network 535. Alternatively, the service provider computer 505 may communicate with a plurality of different acquiring platforms and/or transaction networks, such as 535. Following, the output of a proposed debit transaction, the debit transaction routing module 567 may receive and process a wide variety of responses, such as an approval of the proposed debit transaction, a denial of the proposed debit transaction, and/or messages associated with applied rules and/or identified incentives.

With continued reference to the merchant computer 510, one or more consumer device readers 562 may be provided in certain embodiments. A consumer device reader 562 may facilitate communication with a consumer device at a point of sale. For example, a consumer device reader 562 may facilitate the reading of payment account information from a consumer device. A wide variety of different types of consumer device readers may be utilized as desired in various embodiments of the disclosure, including but not limited to, magnetic stripe readers, radio frequency readers, near field communication readers, etc. In certain embodiments, a reader 562 may be incorporated into the merchant computer 510. In other embodiments, a reader 562 may be in communication with the merchant computer 510.

The one or more I/O interfaces 563 may facilitate communication between the merchant computer 510 and one or more input/output devices; for example, one or more user interface devices, such as a display, a keypad, a mouse, a pointing device, a control panel, a touch screen display, a remote control, a microphone, a speaker, a consumer device reader 562, etc., that facilitate user interaction with the service provider computer 505. The one or more network interfaces 564 may facilitate connection of the merchant computer 510 to one or more suitable networks, for example, the network(s) 525, 535 illustrated in FIG. 5. In this regard, the merchant computer 510 may receive and/or communicate information to other components of the system 500.

Additionally, with continued reference to FIG. 5, any number of consumer devices 515 may be provided. Examples of suitable consumer devices 515 include, but are not limited to, transaction cards, contactless transaction devices (e.g., transaction devices including a contactless chip, etc.), mobile devices (e.g., mobile phones, smart phones, etc.), and/or personal computers. Certain consumer devices 515, such as mobile devices and/or personal computers, may be utilized by a consumer to provide consumer rules and/or preferences to the service provider computer 505. For example, a consumer may utilize a consumer device 515 to access a Web server 550 that presents one or more Web pages that facilitate the provision of rules and/or parameters to the service provider computer. Additionally, various consumer devices 515 may facilitate the provision of payment account information to a merchant computer 510 in association with a proposed debit transaction. For example, a payment card, contactless device, or a transaction-enabled mobile device (e.g., a mobile device including NFC or other contactless technology) may be presented at a point of sale to provide payment account information to a merchant computer 510. As another example, a personal computer or mobile device may be utilized to access a Web site of the merchant via one or more suitable networks 525 (e.g., the Internet, a cellular network, etc.) and a debit purchase transaction may be requested. During a debit purchase request, various payment account information may be provided to a merchant computer 510 by the consumer device 515. As desired, certain consumer devices 515 may be processor-driven devices that include components similar to those described above for the service provider computer 505 and/or the merchant computer 510. For example, certain consumer devices 515 may include one or more processors, memory devices, I/O interfaces, and/or network interfaces.

With continued reference to FIG. 5, any number of issuer and/or financial institution systems (issuer system) 520 may be provided. An issuer system 520 may facilitate the back-end processing of a proposed debit transaction. For example, an issuer system 520 may facilitate the approval and/or settlement of a proposed debit transaction. In certain embodiments, a proposed debit transaction may be routed to an issuer system 520 via a suitable transaction network 535, and the issuer system 520 may evaluate the proposed debit transaction. An approval or rejection of the proposed debit transaction may then be output for communication to a merchant computer 510. The issuer system 520 may then facilitate the settlement of the proposed debit transaction.

Additionally, as desired in various embodiments, an issuer system 520 (which may or may not be associated with a merchant) may provide a wide variety of rules and/or parameters to the service provider computer 505. For example, rules may be provided to an associated Web server 550 via one or more suitable networks 530. As another example, rules may be provided via an inter-process communication and/or via any number of suitable communication techniques. As desired, an issuer system 520 may be or may include any number of processor-driven devices that include components similar to those described above for the service provider computer 505 and/or the merchant computer 510. For example, an issuer system 520 may include one or more processors, memory devices, I/O interfaces, and/or network interfaces that facilitate the operations of the issuer system 520.

A wide variety of suitable networks 525, 530, 535 may be utilized in association with embodiments of the disclosure. Certain networks 525, 530 (which may be the same network or different networks) may facilitate the communication of rules to the service provider computer 505 and/or the communication of transaction requests (e.g., eCommerce requests) from the consumer devices 515 to the merchant computers 510. These networks 525, 530 may include any telecommunication and/or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. Other networks 535 may be suitable transaction networks that facilitate the routing of proposed debit transactions. These transaction networks 535 may include branded networks (e.g., a VISA network, etc.), debit and/or PIN networks, and/or a wide variety of other suitable transaction networks. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

In one example implementation of the system 500, a service provider may collect rules and/or parameters from a wide variety of different entities and/or devices, such as payment account issuers, merchants, and/or consumers. These various rules and/or parameters may be stored for subsequent use in processing proposed debit transactions. Following the storage of rules and/or parameters, a consumer may utilize a consumer device 515 to provide payment account information to a merchant computer 510. For example, a consumer may present a payment card, contactless device, or mobile device at a merchant point of sale, and payment account information may be read from the consumer device. As another example, a consumer may provide payment account information to a merchant computer 510 in association with an eCommerce or Web-based transaction. The merchant computer 510 may generate a proposed debit transaction, and the merchant computer 510 may output the proposed debit transaction for communication to the service provider computers 505 either directly or via one or more other entities, such as an acquiring platform 555. The service provider computers 505 may utilize at least a portion of the stored rules to process the proposed debit transaction, and the service provider computers 505 may optionally direct the routing of the proposed debit transaction to a suitable and/or identified transaction network, such as 535, and an issuer or financial institution system for authorization and/or settlement. Additionally, a wide variety of other processing rules and/or parameters may be applied to a proposed debit transaction.

The system 500 shown in and described with respect to FIG. 5 is provided by way of example only. Numerous other operating environments, system architectures, and device configurations are possible. Other system embodiments can include fewer or greater numbers of components and may incorporate some or all of the functionality described with respect to the system components shown in FIG. 5. Accordingly, embodiments of the disclosure should not be construed as being limited to any particular operating environment, system architecture, or device configuration.

Figure 6:
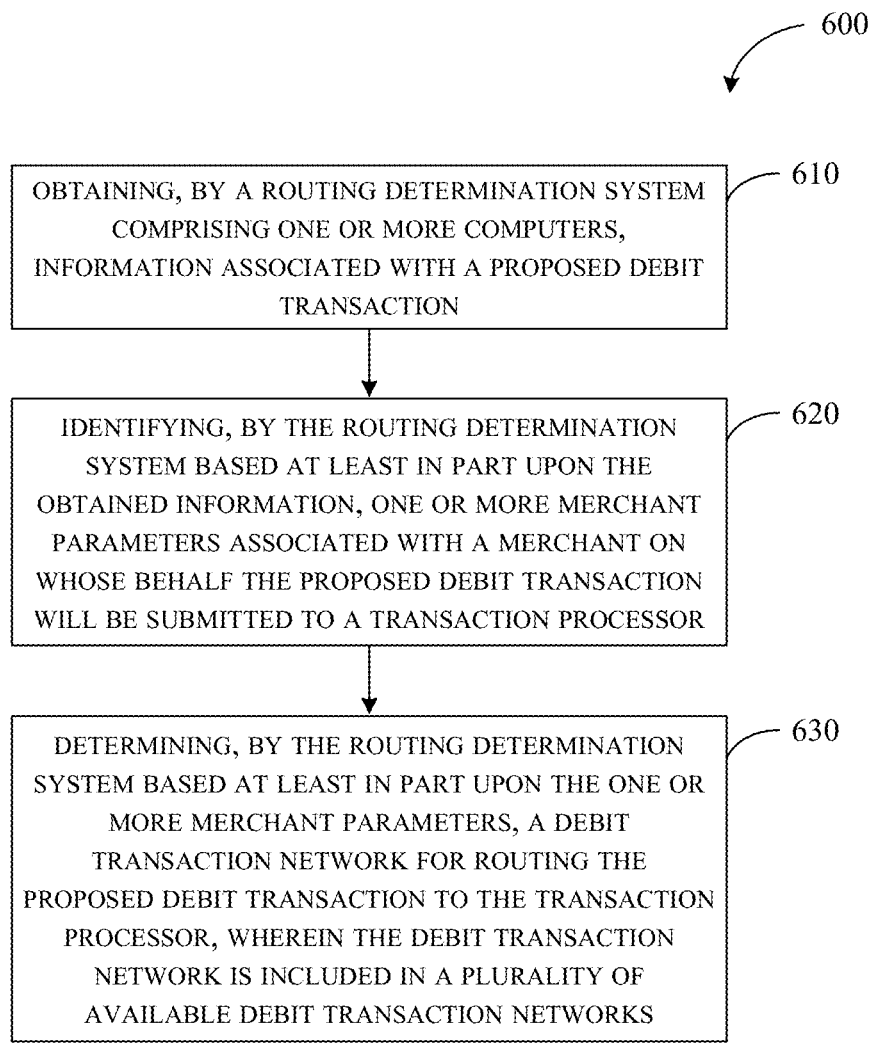
FIG. 6 is an example flowchart for a method in accordance with an embodiment of the disclosure.

FIG. 6 illustrates an example method according to an embodiment of the disclosure. The method 600 shown in FIG. 6 can be used to route debit transactions. In certain embodiments, the operations of the method 600 may be performed by a suitable service provider computer, such as the service provider computer 505 and/or a debit transaction routing module 547 illustrated in FIG. 5. In other embodiments, the operations of the method 600 may be performed by a merchant computer device, such as the merchant computer device 510 and/or a debit transaction routing module 567 illustrated in FIG. 5

The method 600 begins at block 610, in which a routing determination system with one or more computers, can obtain information associated with a proposed debit transaction. For example, in one embodiment, the merchant computer 510 can obtain or otherwise receive information associated with a proposed debit transaction when a card, mobile device, or contactless device, such as 515, is used by a consumer at a merchant location. In any instance, a debit transaction routing module, such as 547 or 567, can obtain or otherwise receive some or all of the information associated with the proposed debit transaction.

In one embodiment, obtaining information associated with a proposed debit transaction can include receiving a routing determination request from a merchant device. For example, in one embodiment, the merchant computer 510 can receive information associated with a proposed debit transaction when a card, mobile device, or contactless device, such as 515, is used by a consumer at a merchant location, and the merchant computer 510 can transmit some or all of the information to the service provider computer 505.

Block 610 is followed by block 620, in which the routing determination system can identify, based at least in part on the obtained information, one or more merchant parameters associated with a merchant on whose behalf the proposed debit transaction will be submitted to a transaction processor. For example, in one embodiment, the service provider computer 505 and/or a debit transaction routing module, such as 547 or 567, can identify, based at least in part on the obtained information, one or more merchant parameters associated with a merchant on whose behalf the proposed debit transaction will be submitted to a transaction processor.

In one embodiment, identifying one or more merchant parameters can include identifying one or more parameters associated with an established banking relationship for the merchant, and wherein determining a debit transaction network can include determining a debit transaction network based at least in part upon the established banking relationship. For example, in one embodiment, the service provider computer 505 and/or a debit transaction routing module, such as 547 or 567, can identify one or more parameters associated with an established banking relationship for the merchant, and wherein determining a debit transaction network can include determining a debit transaction network based at least in part upon the established banking relationship.

In one embodiment, identifying one or more merchant parameters can include identifying one or more parameters associated with an outlet of the merchant, and wherein determining a debit transaction network can include determining a debit transaction based at least in part upon the outlet of the merchant. For example, in one embodiment, the service provider computer 505 and/or a debit transaction routing module, such as 547 or 567, can identify one or more parameters associated with an outlet of the merchant, and wherein determining a debit transaction network can include determining a debit transaction based at least in part upon the outlet of the merchant.

In one embodiment, identifying one or more merchant parameters can include identifying one or more cost parameters, and wherein determining a debit transaction network can include determining a debit transaction network having a lowest cost to the merchant. For example, in one embodiment, the service provider computer 505 and/or a debit transaction routing module, such as 547 or 567, can identify one or more cost parameters, and wherein determining a debit transaction network can include determining a debit transaction network having a lowest cost to the merchant.

In one embodiment, identifying one or more merchant parameters can include identifying one or more parameters associated with a routing channel negotiated by the merchant and the transaction processor, and wherein determining a debit transaction network can include determining a debit transaction network based at least in part upon the negotiated routing channel. For example, in one embodiment, the service provider computer 505 and/or a debit transaction routing module, such as 547 or 567, can identify one or more parameters associated with a routing channel negotiated by the merchant and the transaction processor, and wherein determining a debit transaction network can include determining a debit transaction network based at least in part upon the negotiated routing channel.

In one embodiment, identifying one or more merchant parameters can include identifying one or more volume parameters associated with a threshold volume of transactions to be routed via a predetermined debit transaction network, and wherein determining a debit transaction network can include: determining whether the threshold volume has been satisfied; and identifying, if the threshold volume has not been satisfied, the predetermined debit transaction network as the debit transaction network for routing; or determining, if the threshold volume has been satisfied, the debit transaction network based at least in part upon one or more additional parameters. For example, in one embodiment, the service provider computer 505 and/or a debit transaction routing module, such as 547 or 567, can identify one or more volume parameters associated with a threshold volume of transactions to be routed via a predetermined debit transaction network, and wherein determining a debit transaction network can include: determining whether the threshold volume has been satisfied; and identifying, if the threshold volume has not been satisfied, the predetermined debit transaction network as the debit transaction network for routing; or determining, if the threshold volume has been satisfied, the debit transaction network based at least in part upon one or more additional parameters.

In one embodiment, identifying one or more merchant parameters can include identifying one or more transaction price parameters, and wherein determining a debit transaction network can include: identifying, based at least in part upon the obtained information, a monetary amount associated with the proposed debit transaction; and determining the debit transaction network based at least in part upon the determined monetary amount and the one or more transaction price parameters. For example, in one embodiment, the service provider computer 505 and/or a debit transaction routing module, such as 547 or 567, can identify one or more transaction price parameters, and wherein determining a debit transaction network can include: identifying, based at least in part upon the obtained information, a monetary amount associated with the proposed debit transaction; and determining the debit transaction network based at least in part upon the determined monetary amount and the one or more transaction price parameters.

In one aspect of an embodiment, determining the debit transaction network based at least in part upon the determined monetary amount and the one or more transaction price parameters can include: identifying, based at least in part upon the monetary amount, a transaction price category for the proposed transaction; and determining the debit transaction network based at least in part upon the transaction price category. For example, in one embodiment, the service provider computer 505 and/or a debit transaction routing module, such as 547 or 567, can identify, based at least in part upon the monetary amount, a transaction price category for the proposed transaction; and determine the debit transaction network based at least in part upon the transaction price category.

In one embodiment, identifying one or more merchant parameters can include identifying one or more transaction category parameters, and wherein determining a debit transaction network can include: identifying, based at least in part upon the obtained information, a transaction category associated with the proposed transaction; and determining the debit transaction network based at least in part upon the determined transaction category and the one or more transaction category parameters. For example, in one embodiment, the service provider computer 505 and/or a debit transaction routing module, such as 547 or 567, can identify one or more transaction category parameters, and wherein determining a debit transaction network can include: identifying, based at least in part upon the obtained information, a transaction category associated with the proposed transaction; and determining the debit transaction network based at least in part upon the determined transaction category and the one or more transaction category parameters.

Block 620 is followed by block 630, in which the routing determination system, determines, based at least in part on the one or more merchant parameters, a debit transaction network for routing the proposed debit transaction to the transaction processor, wherein the debit transaction network is included in a plurality of available debit transaction networks. For example, in one embodiment, the service provider computer 505 and/or a debit transaction routing module, such as 547 or 567, can determine, based at least in part on the one or more merchant parameters, a debit transaction network for routing the proposed debit transaction to the transaction processor, wherein the debit transaction network is included in a plurality of available debit transaction networks.

In one embodiment, the method 600 can also include transmitting, by the routing determination system to the merchant device, an indication of the debit transaction network. For example, in one embodiment, the service provider computer 505 and/or a debit transaction routing module, such as 547 or 567, can generate and/or transmit, to the merchant device, an indication of the debit transaction network.

In one embodiment, the method 600 can also include identifying, by the routing determination system, a first set of one or more debit transaction networks supported by the merchant; identifying, by the routing determination system, a second set of one or more debit transaction networks supported by the transaction processor; and identifying, by the routing determination system, the plurality of available debit transaction networks by identifying common debit transaction networks included in both the first set and the second set. For example, in one embodiment, the service provider computer 505 and/or a debit transaction routing module, such as 547 or 567, can identify a first set of one or more debit transaction networks supported by the merchant; identify a second set of one or more debit transaction networks supported by the transaction processor; and identify the plurality of available debit transaction networks by identifying common debit transaction networks included in both the first set and the second set.

In one embodiment, the method 600 can include identifying, by the routing determination system, one or more respective cost proposals associated with each of the available debit transaction networks, wherein determining a debit transaction network can include determining a debit transaction network based at least in part upon an analysis of the identified cost bids. For example, in one embodiment, the service provider computer 505 and/or a debit transaction routing module, such as 547 or 567, can identify one or more respective cost proposals associated with each of the available debit transaction networks, wherein determining a debit transaction network can include determining a debit transaction network based at least in part upon an analysis of the identified cost bids.

In one embodiment, the method 600 can include identifying, by the routing determination system, one or more transaction processor parameters associated with the transaction processor, wherein determining a debit transaction network comprises determining the debit transaction network based at least in part upon the one or more identified transaction processor parameters. For example, in one embodiment, the service provider computer 505 and/or a debit transaction routing module, such as 547 or 567, can identify one or more transaction processor parameters associated with the transaction processor, wherein determining a debit transaction network comprises determining the debit transaction network based at least in part upon the one or more identified transaction processor parameters.

The operations described and shown in the method 600 of FIG. 6 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 6 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for routing debit transactions, comprising:
   obtaining, by a routing determination system comprising one or more processors, information associated with a proposed debit transaction;
   identifying, by the routing determination system based at least in part upon the obtained information, one or more merchant parameters associated with a merchant on whose behalf the proposed debit transaction will be submitted to a transaction processor, the one or more merchant parameters comprising a first product type associated with the proposed debit transaction, wherein the merchant parameters include routing logic and are contained in merchant routing configuration data;
   identifying, by the routing determination system, a plurality of available supported debit transaction networks;
   ordering, by the routing determination system based at least in part upon the one or more merchant parameters, the plurality of available supported debit transaction networks to create an ordered hierarchy of the available supported debit transaction networks; and
   determining, based at least in part on the ordering, a debit transaction network from the plurality of available supported debit transaction networks for routing the proposed debit transaction to the transaction processor, wherein:
      ordering the available supported debit transaction networks comprises ordering the available supported debit transaction networks based at least in part on the first product type, an existing routing agreement between the merchant and the transaction processor, one or more state override factors that legally establish or set a network precedence between any number of debit transaction networks, and one or more network outage factors, wherein at least one of the one or more network outage factors allows for a network to be placed at a bottom of the ordered hierarchy in reserve for use during a network problem; and
      providing an option for the merchant to revise the ordered hierarchy.

2. The method of claim 1, wherein obtaining information associated with a proposed debit transaction comprises receiving a routing determination request from a merchant device.

3. The method of claim 2, further comprising:
   transmitting, by the routing determination system to the merchant device, an indication of the debit transaction network.

4. The method of claim 1, further comprising:
   identifying, by the routing determination system, a first set of one or more debit transaction networks supported by the merchant;
   identifying, by the routing determination system, a second set of one or more debit transaction networks supported by the transaction processor; and identifying, by the routing determination system, the plurality of available debit transaction networks by identifying common debit transaction networks included in both the first set and the second set.

5. The method of claim 1, wherein identifying one or more merchant parameters comprises identifying one or more parameters associated with an established banking relationship for the merchant, and
  wherein determining a debit transaction network comprises determining a debit transaction network based at least in part upon the established banking relationship.

6. The method of claim 1, wherein identifying one or more merchant parameters comprises identifying one or more parameters associated with an outlet of the merchant, and
  wherein determining a debit transaction network comprises determining a debit transaction based at least in part upon the outlet of the merchant.

7. The method of claim 1, wherein identifying one or more merchant parameters comprises identifying one or more cost parameters, and
  wherein determining a debit transaction network comprises determining a debit transaction network having a lowest cost to the merchant.

8. The method of claim 1, further comprising:
  identifying, by the routing determination system, one or more respective cost proposals associated with each of the available debit transaction networks,
  wherein determining a debit transaction network comprises determining a debit transaction network based at least in part upon an analysis of the identified cost bids.

9. The method of claim 1, wherein identifying one or more merchant parameters comprises identifying one or more parameters associated with a routing channel negotiated by the merchant and the transaction processor, and
  wherein determining a debit transaction network comprises determining a debit transaction network based at least in part upon the negotiated routing channel.

10. The method of claim 1, wherein identifying one or more merchant parameters comprises identifying one or more volume parameters associated with a threshold volume of transactions to be routed via a predetermined debit transaction network, and
  wherein determining a debit transaction network comprises:
    determining whether the threshold volume has been satisfied; and
    identifying, if the threshold volume has not been satisfied, the predetermined debit transaction network as the debit transaction network for routing; or
    determining, if the threshold volume has been satisfied, the debit transaction network based at least in part upon one or more additional parameters.

11. The method of claim 1, wherein identifying one or more merchant parameters comprises identifying one or more transaction price parameters, and
  wherein determining a debit transaction network comprises:
    identifying, based at least in part upon the obtained information, a monetary amount associated with the proposed debit transaction; and
    determining the debit transaction network based at least in part upon the determined monetary amount and the one or more transaction price parameters.

12. The method of claim 11, wherein determining the debit transaction network based at least in part upon the determined monetary amount and the one or more transaction price parameters comprises:
  identifying, based at least in part upon the monetary amount, a transaction price category for the proposed transaction; and
  determining the debit transaction network based at least in part upon the transaction price category.

13. The method of claim 1, wherein identifying one or more merchant parameters comprises identifying one or more transaction category parameters, and
  wherein determining a debit transaction network comprises:
    identifying, based at least in part upon the obtained information, a transaction category associated with the proposed transaction; and
    determining the debit transaction network based at least in part upon the determined transaction category and the one or more transaction category parameters.

14. The method of claim 1, further comprising:
  identifying, by the routing determination system, one or more transaction processor parameters associated with the transaction processor,
  wherein determining a debit transaction network comprises determining the debit transaction network based at least in part upon the one or more identified transaction processor parameters.

15. A system for routing debit transactions, comprising:
  at least one memory device configured to store computer-executable instructions; and
  at least one processor configured to access the at least one memory device and execute the computer-executable instructions to:
    obtain information associated with a proposed debit transaction;
    identify, based at least in part upon the obtained information, one or more merchant parameters associated with a merchant on whose behalf the proposed debit transaction will be submitted to a transaction processor, wherein the merchant parameters include routing logic and are contained in merchant routing configuration data;
    identify a plurality of available supported debit transaction networks;
    order, based at least in part upon the one or more merchant parameters, the plurality of available supported debit transaction networks to create an ordered hierarchy of the available supported debit transaction networks; and
    determine, based at least in part on the ordering, a debit transaction network from the plurality of available supported debit transaction networks for routing the proposed debit transaction to the transaction processor, wherein:
      the one or more merchant parameters comprises a first product type associated with the proposed debit transaction,
      the available supported debit transaction networks are ordered based at least in part on the first product type, an existing routing agreement between the merchant and the transaction processor, one or more state override factors that legally establish or set a network precedence between any number of debit transaction networks, and one or more network outage factors, wherein at least one of the one or more network outage factors allows for a network to be placed at a bottom of the ordered hierarchy in reserve for use during a network problem; and the merchant is provided an option to revise the ordered hierarchy.

16. The system of claim 15, wherein the information associated with a proposed debit transaction is obtained by one of (i) a routing determination service provider, (ii) an acquiring platform device, or (iii) a merchant device.

17. The system of claim 15, wherein the at least one processor is further configured to execute the computer-executable instructions to:

direct the transmission of an indication of the debit transaction network to a merchant device.

18. The system of claim 15, wherein the at least one processor is further configured to execute the computer-executable instructions to:

identify a first set of one or more debit transaction networks supported by the merchant;

identify a second set of one or more debit transaction networks supported by the transaction processor; and identify the plurality of available debit transaction networks by identifying common debit transaction networks included in both the first set and the second set.

19. The system of claim 15, wherein the one or more merchant parameters comprises one or more parameters associated with an established banking relationship for the merchant, and wherein the debit transaction network is determined based at least in part upon the established banking relationship.

20. The system of claim 15, wherein the one or more merchant parameters comprise one or more parameters associated with an outlet of the merchant, and wherein the debit transaction network is determined based at least in part upon the outlet of the merchant.

21. The system of claim 15, wherein the one or more merchant parameters comprise one or more cost parameters, and wherein the determined debit transaction network comprises a debit transaction network having a lowest cost to the merchant.

22. The system of claim 15, wherein the at least one processor is further configured to execute the computer-executable instructions to:

identify one or more respective cost proposals associated with each of the available debit transaction networks; and determine the debit transaction network based at least in part upon an analysis of the identified cost bids.

23. The system of claim 15, wherein the one or more merchant parameters comprise one or more parameters associated with a routing channel negotiated by the merchant and the transaction processor, and wherein the debit transaction network is determined based at least in part upon the negotiated routing channel.

24. The system of claim 15, wherein the one or more merchant parameters comprise one or more volume parameters associated with a threshold volume of transactions to be routed via a predetermined debit transaction network, and wherein the at least one processor is configured to determine the debit transaction network by executing the computer-executable instructions to:

determine whether the threshold volume has been satisfied; and identify, if the threshold volume has not been satisfied, the predetermined debit transaction network as the debit transaction network for routing; or determine, if the threshold volume has been satisfied, the debit transaction network based at least in part upon one or more additional parameters.

25. The system of claim 15, wherein the one or more merchant parameters comprise one or more transaction price parameters, and wherein the at least one processor is configured to determine the debit transaction network by executing the computer-executable instructions to:

identify, based at least in part upon the obtained information, a monetary amount associated with the proposed debit transaction; and determine the debit transaction network based at least in part upon the determined monetary amount and the one or more transaction price parameters.

26. The system of claim 25, wherein the at least one processor is further configured to execute the computer-executable instructions to:

identify, based at least in part upon the monetary amount, a transaction price category for the proposed transaction; and determine the debit transaction network based at least in part upon the transaction price category.

27. The system of claim 15, wherein the one or more merchant parameters comprise one or more transaction category parameters, and wherein the at least one processor is configured to determine the debit transaction network by executing the computer-executable instructions to:

identify, based at least in part upon the obtained information, a transaction category associated with the proposed transaction; and determine the debit transaction network based at least in part upon the determined transaction category and the one or more transaction category parameters.

28. The system of claim 15, wherein the at least one processor is further configured to execute the computer-executable instructions to:

identify one or more transaction processor parameters associated with the transaction processor; and determine the debit transaction network based at least in part upon the one or more identified transaction processor parameters.

* * * * *